United States Patent
Hyun et al.

(10) Patent No.: US 11,449,097 B2
(45) Date of Patent: Sep. 20, 2022

(54) VERTICALLY ARRANGED FOLDER-TYPE DUAL MONITOR

(71) Applicant: BLD CO., LTD., Seoul (KR)

(72) Inventors: Euy Sub Hyun, Seoul (KR); Tae Hoo Jung, Seoul (KR)

(73) Assignee: BLD CO., LTD, Seoul (KR)

( * ) Notice: Subject to any disclaimer, the term of this patent is extended or adjusted under 35 U.S.C. 154(b) by 0 days.

(21) Appl. No.: 17/596,776

(22) PCT Filed: Jun. 19, 2020

(86) PCT No.: PCT/KR2020/007951
§ 371 (c)(1),
(2) Date: Dec. 17, 2021

(87) PCT Pub. No.: WO2020/256459
PCT Pub. Date: Dec. 24, 2020

(65) Prior Publication Data
US 2022/0206530 A1    Jun. 30, 2022

(30) Foreign Application Priority Data
Jun. 19, 2019   (KR) .................. 10-2019-0072868

(51) Int. Cl.
*G06F 1/16* (2006.01)
*G06F 3/0354* (2013.01)
(Continued)

(52) U.S. Cl.
CPC ........ *G06F 1/1616* (2013.01); *G06F 3/03547* (2013.01); *G06F 3/0484* (2013.01); *G06F 3/1423* (2013.01); *G06F 2203/04803* (2013.01)

(58) Field of Classification Search
CPC .... G06F 1/1616; G06F 3/03547; G06F 3/048; G06F 3/1423
(Continued)

(56) References Cited

U.S. PATENT DOCUMENTS 6,664,946 B1 * 12/2003 Stipes ................... G06F 3/0354
345/157
8,473,870 B2 * 6/2013 Hinckley .............. G06F 3/0483
345/173
(Continued)

FOREIGN PATENT DOCUMENTS

JP         3144189 U     8/2008
JP      2014-512552 A    5/2014
(Continued)

OTHER PUBLICATIONS

Notification of Reason for Refusal of KR 10-2019-0072868 dated Dec. 22, 2020.
(Continued)

*Primary Examiner* — Kwin Xie
(74) *Attorney, Agent, or Firm* — Sughrue Mion, PLLC

(57) ABSTRACT

Disclosed is a vertically arranged folder-type dual monitor comprising: a main monitor having a vertical width of a first size; and a folder-type sub monitor which has a vertical width of a second size smaller than the vertical width of the first size, and ascends and descends at a certain inclination angle relative to a hinge part formed on the lower end of the main monitor, wherein a screen is divided by the main monitor and the sub monitor to provide different UIs, thus making it possible to efficiently perform tasks when running a single program or multiple programs.

10 Claims, 18 Drawing Sheets

(51) Int. Cl.
  *G06F 3/0484* (2022.01)
  *G06F 3/14* (2006.01)
  *G06F 3/04886* (2022.01)

(58) Field of Classification Search
  USPC .................................................. 345/156–174
  See application file for complete search history.

(56) References Cited

U.S. PATENT DOCUMENTS

| | | | |
|---|---|---|---|
| 9,366,862 B2* | 6/2016 | Haddick | G06F 3/011 |
| 2006/0094502 A1* | 5/2006 | Katayama | A63F 13/2145 |
| | | | 463/31 |
| 2006/0227106 A1* | 10/2006 | Hashimoto | G06F 3/0482 |
| | | | 345/157 |
| 2010/0185981 A1* | 7/2010 | Nakada | G06V 40/172 |
| | | | 715/810 |
| 2011/0209089 A1* | 8/2011 | Hinckley | G06F 1/1641 |
| | | | 715/810 |
| 2011/0239142 A1* | 9/2011 | Steeves | G06F 3/14 |
| | | | 345/3.1 |
| 2011/0242361 A1* | 10/2011 | Kuwahara | G06F 1/1656 |
| | | | 348/231.4 |
| 2012/0081315 A1* | 4/2012 | Sirpal | G06F 1/1647 |
| | | | 345/173 |
| 2012/0214591 A1* | 8/2012 | Ito | A63F 13/26 |
| | | | 463/31 |
| 2015/0286302 A1 | 10/2015 | Kim | |
| 2016/0231879 A1* | 8/2016 | Sirpal | H04L 41/22 |

FOREIGN PATENT DOCUMENTS

| | | |
|---|---|---|
| KR | 20-1998-0068219 U | 12/1998 |
| KR | 10-2007-0115187 A | 12/2007 |
| KR | 10-2010-0097882 A | 9/2010 |
| KR | 10-2013-0038463 A | 4/2013 |
| KR | 10-2013-0097986 A | 9/2013 |
| KR | 10-1440315 B1 | 10/2014 |
| KR | 10-1521996 B1 | 5/2015 |
| KR | 10-2015-0085396 A | 7/2015 |
| KR | 10-2016-0015352 A | 2/2016 |
| KR | 10-1796683 B1 | 11/2017 |
| KR | 10-1845975 B1 | 5/2018 |

OTHER PUBLICATIONS

Grant of Patent KR 10-2019-0072868 dated Jun. 15, 2021.
International Search Report for PCT/KR2020/007951, dated Jan. 5, 2021.

* cited by examiner

[Fig. 1]
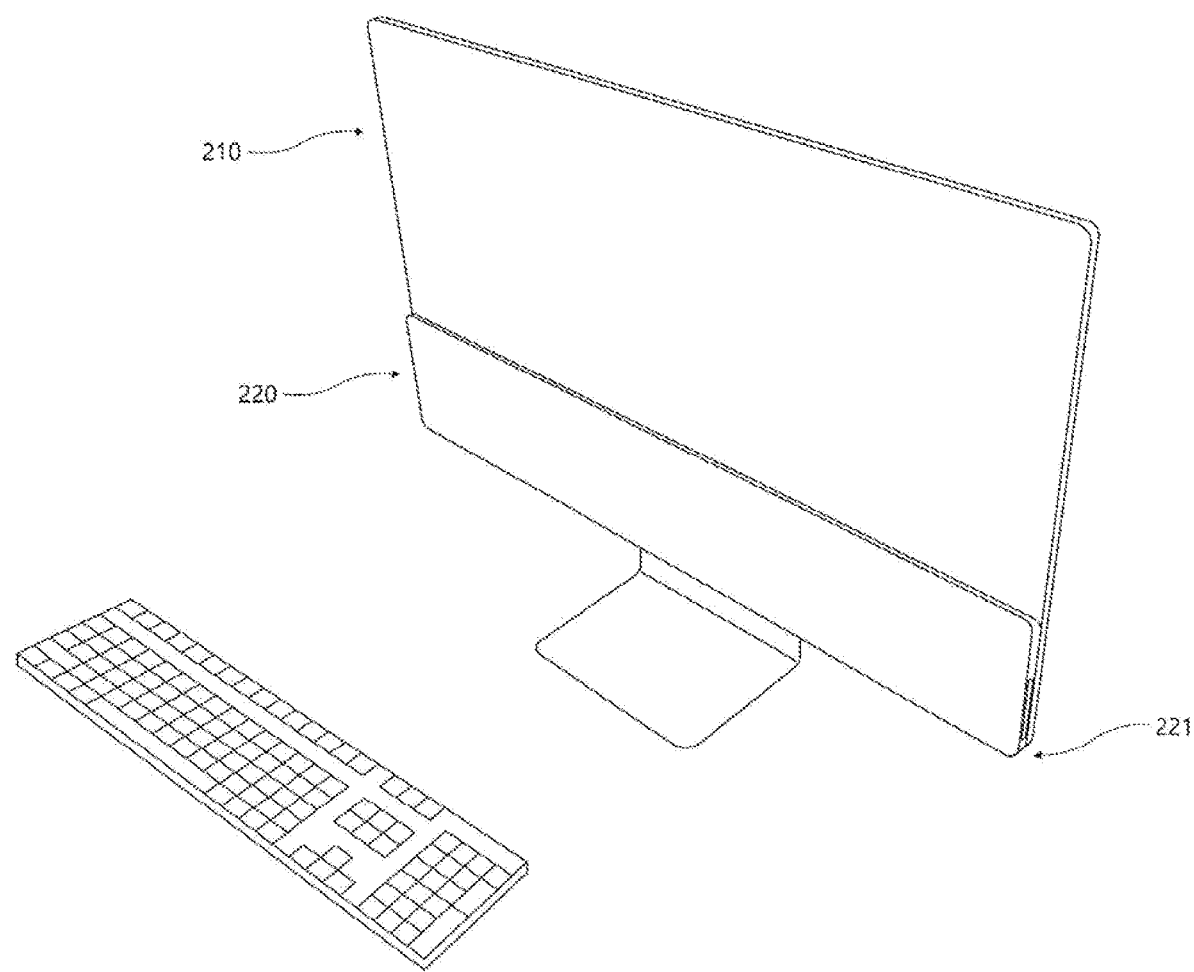

[Fig. 2]
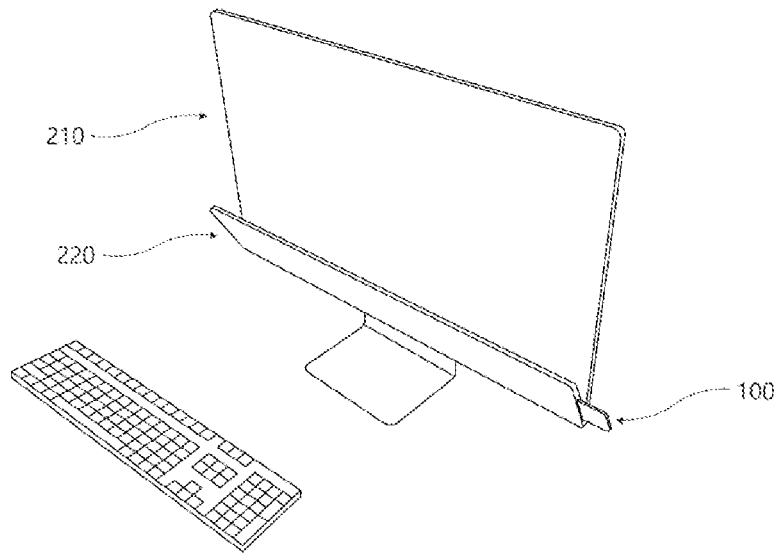
(a)
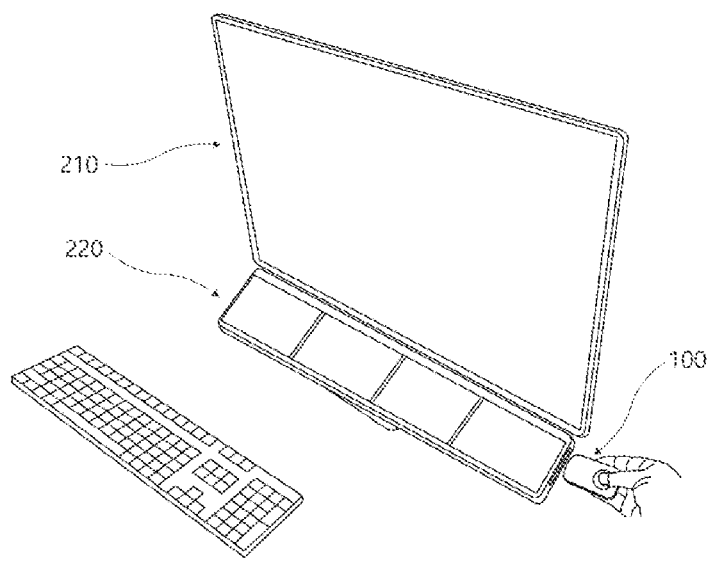
(b)
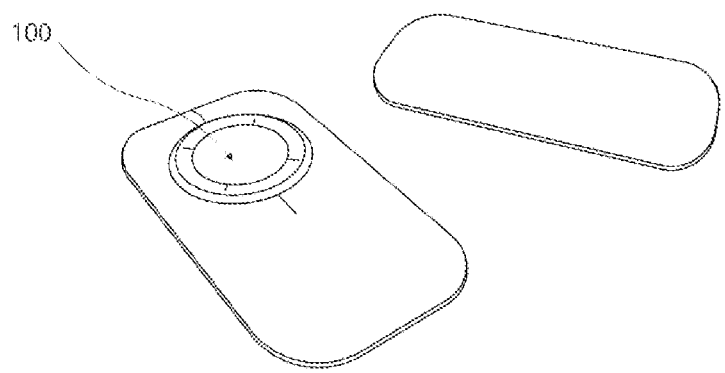
(c)

[Fig. 3A]
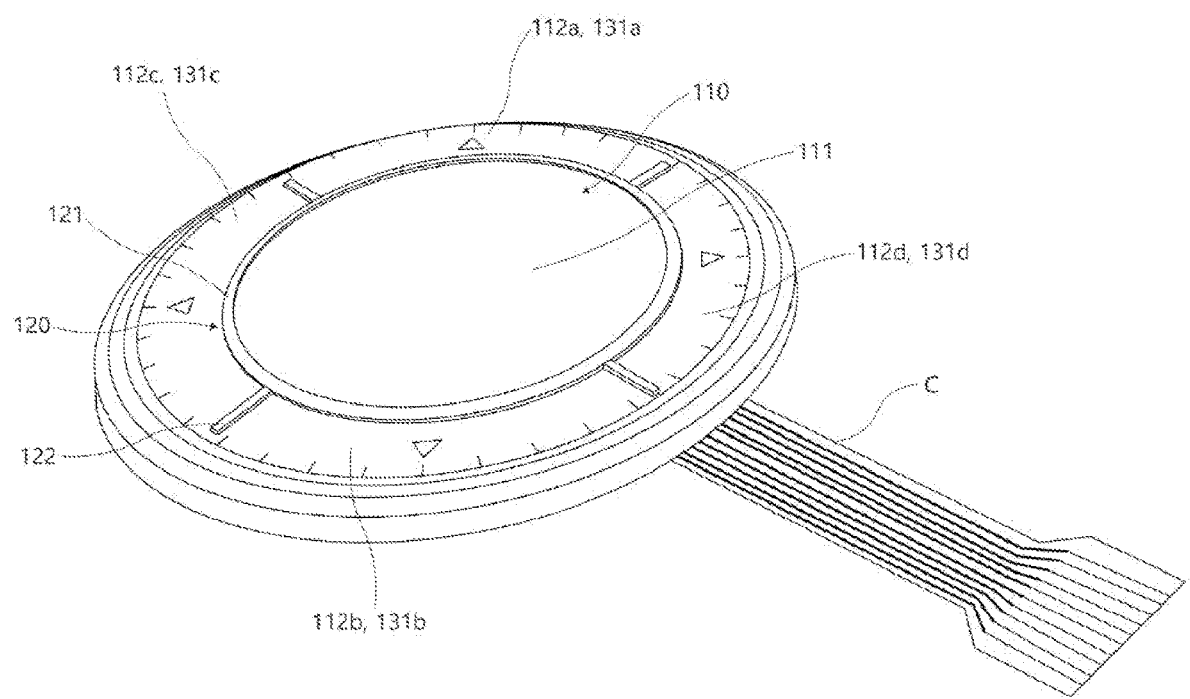

[Fig. 3B]
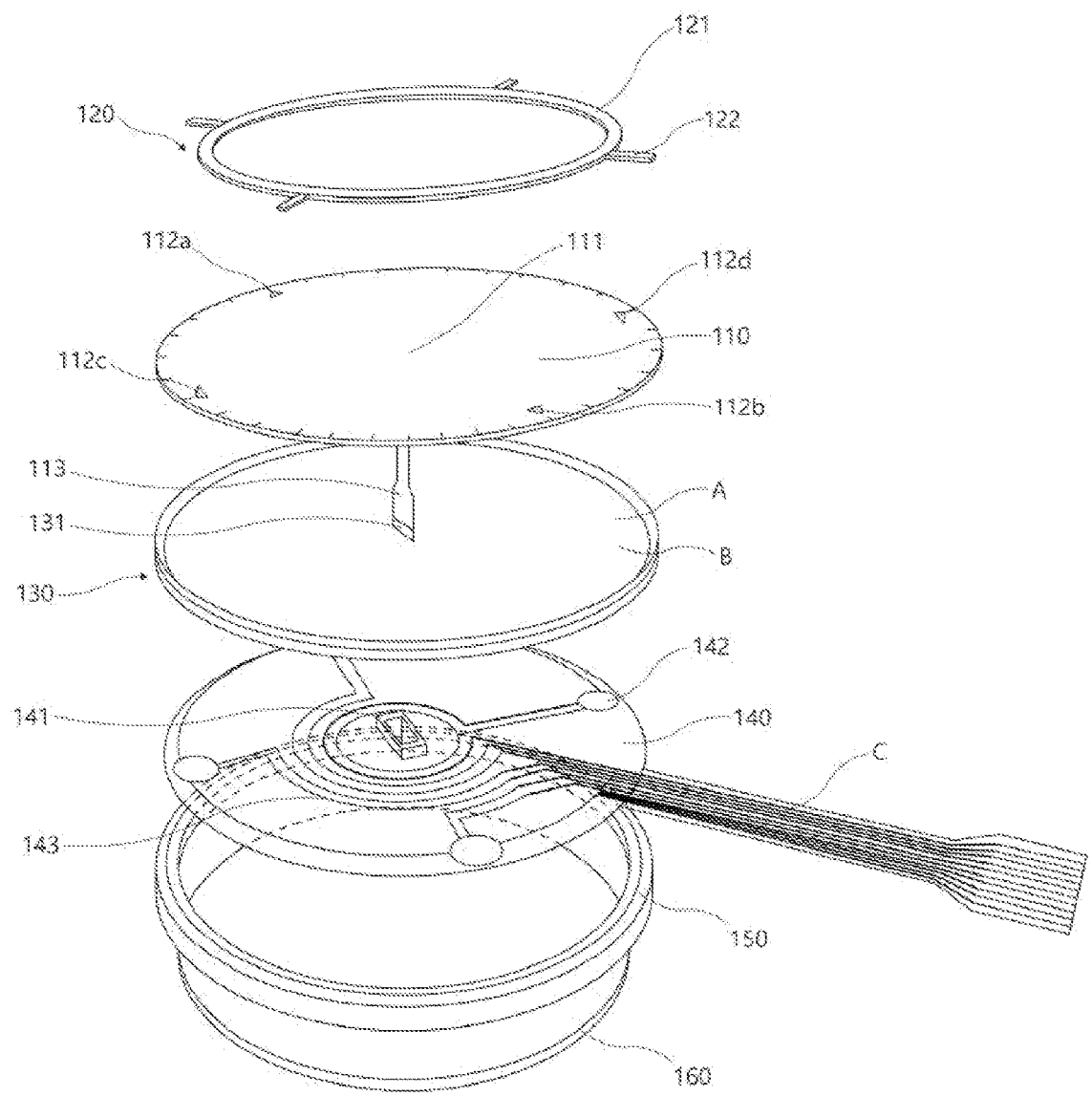

[Fig. 4A]
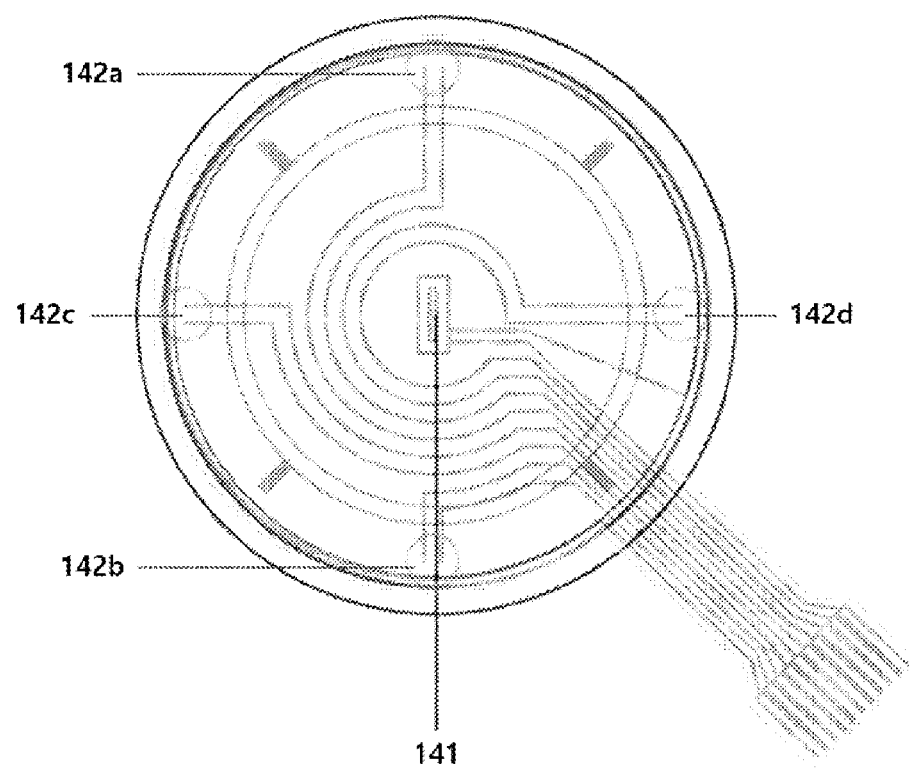

[Fig. 4B]
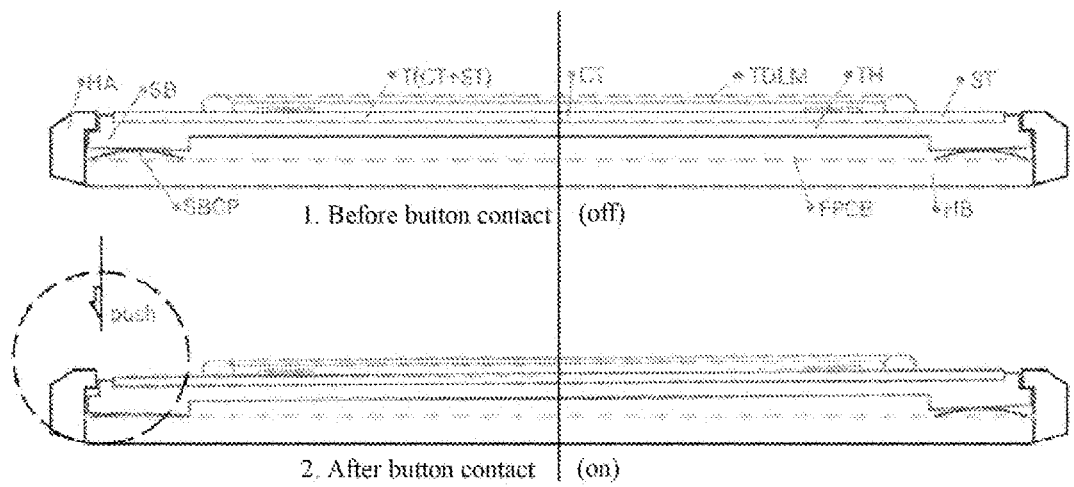
[Fig. 5A]
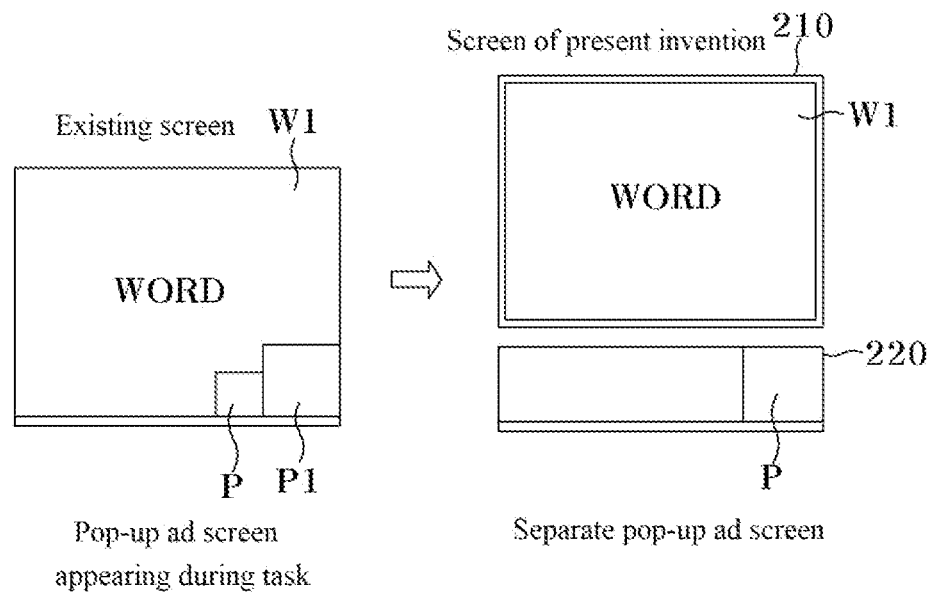

[Fig. 5B]
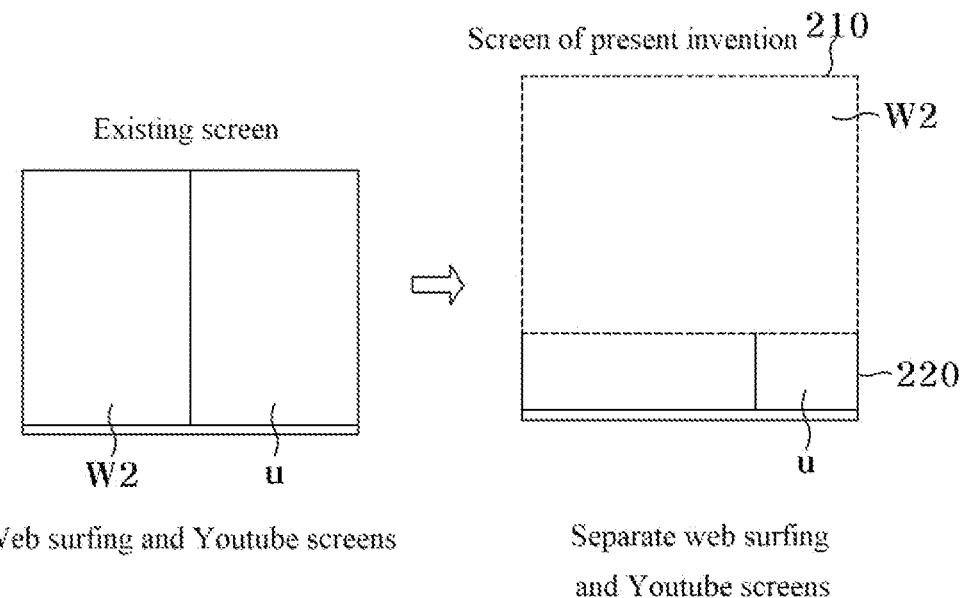
[Fig. 5C]
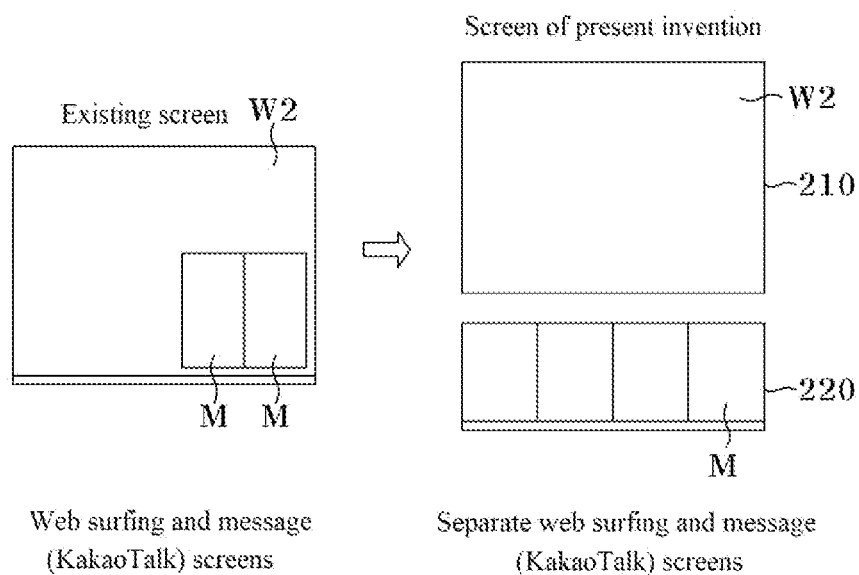

[Fig. 6A]
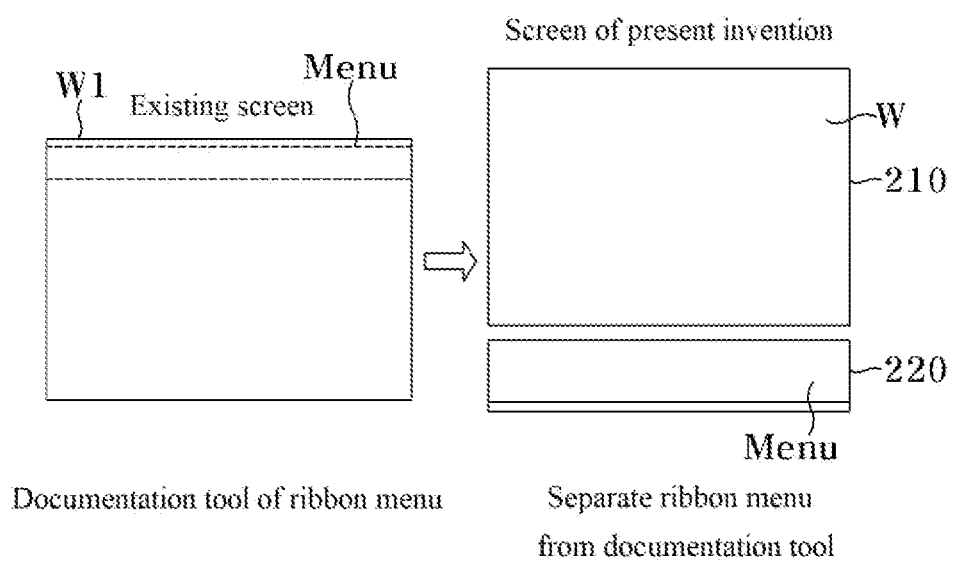

[Fig. 6B]
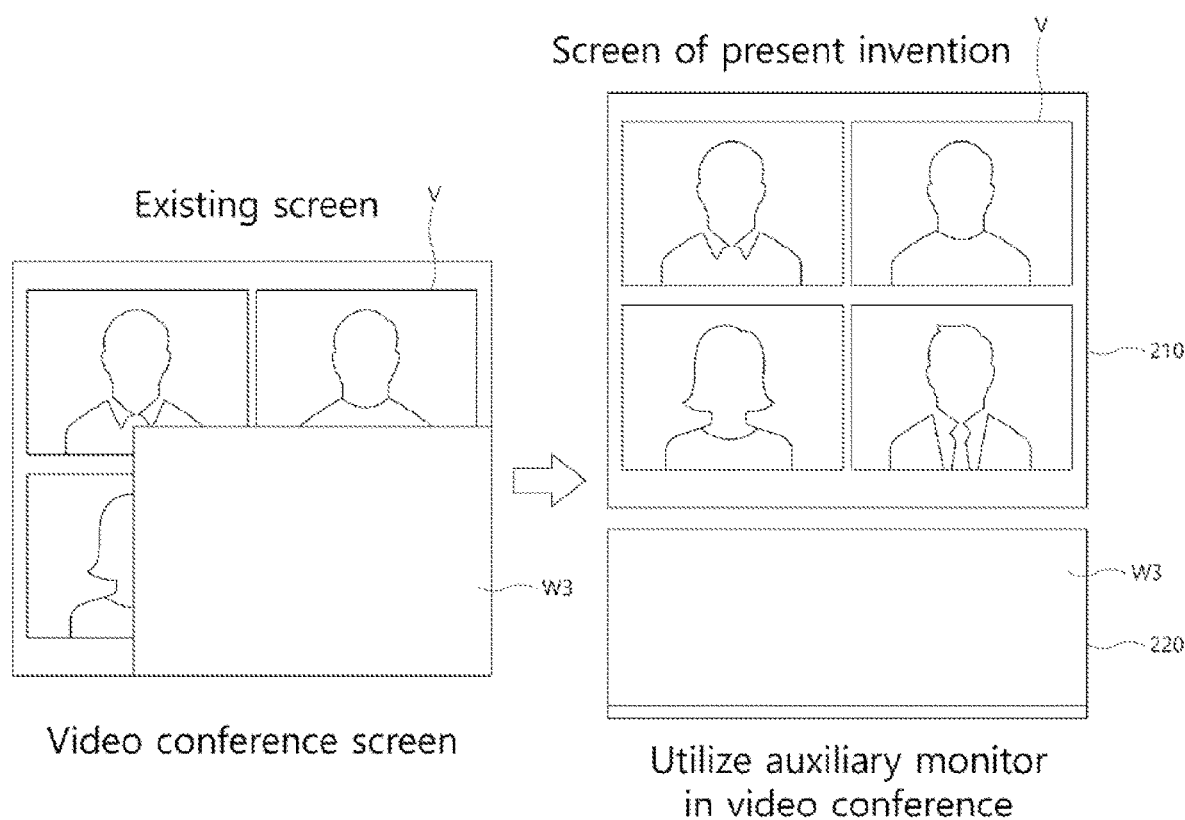

[Fig. 7A]
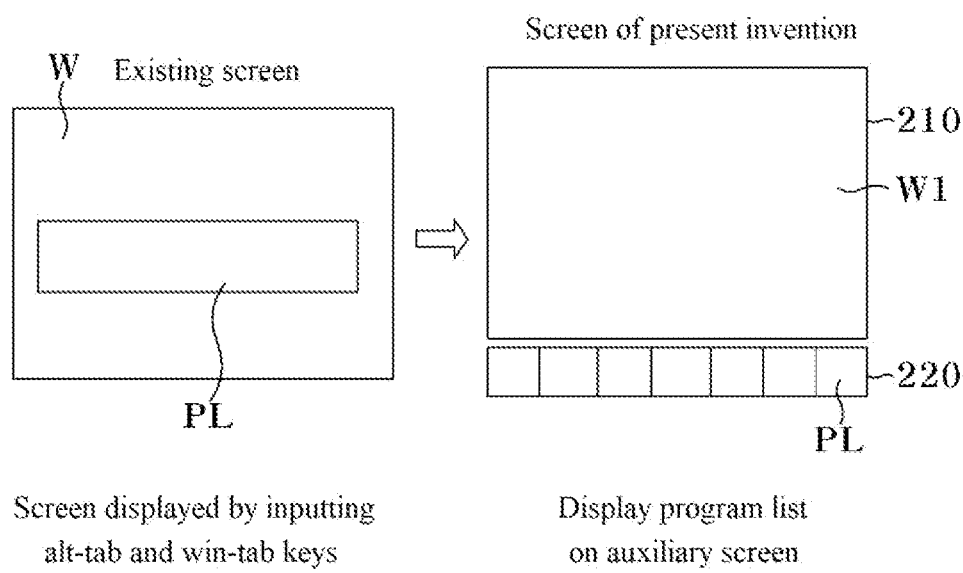
[Fig. 7B]
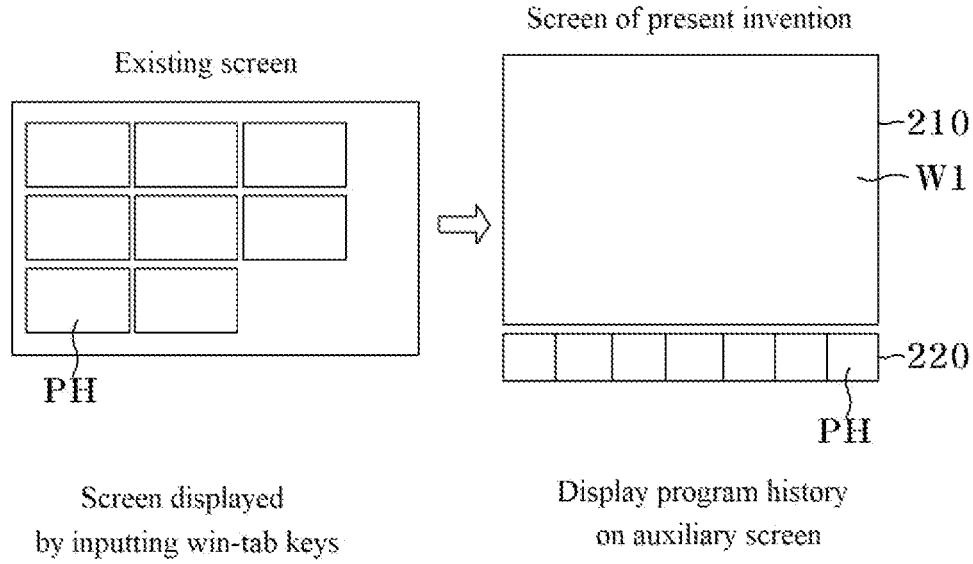

[Fig. 8A]
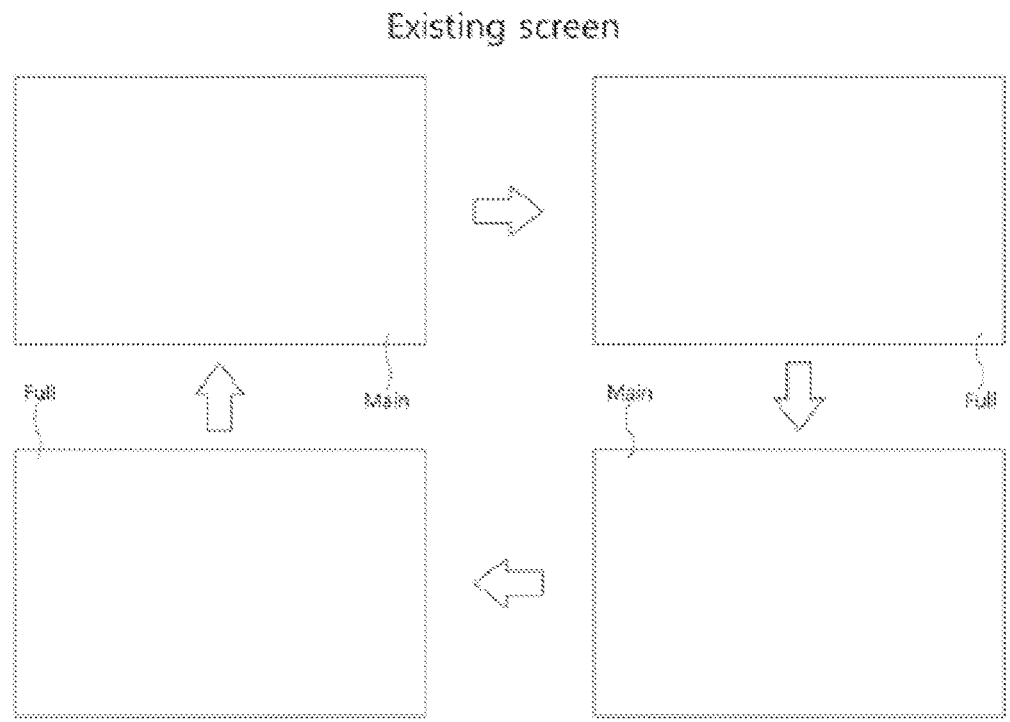
Select video other than Youtube full screen mode
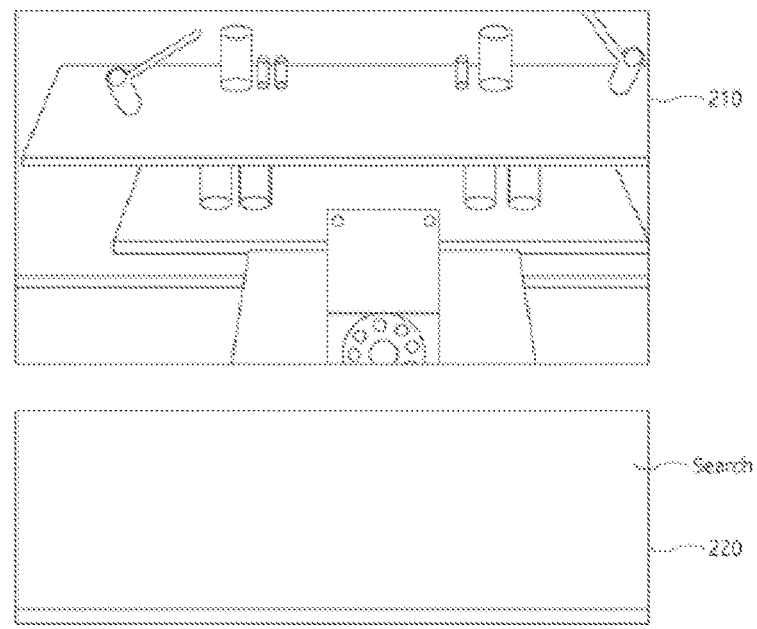
Separate Youtube full screen mode play screen and search screen

[Fig. 8B]
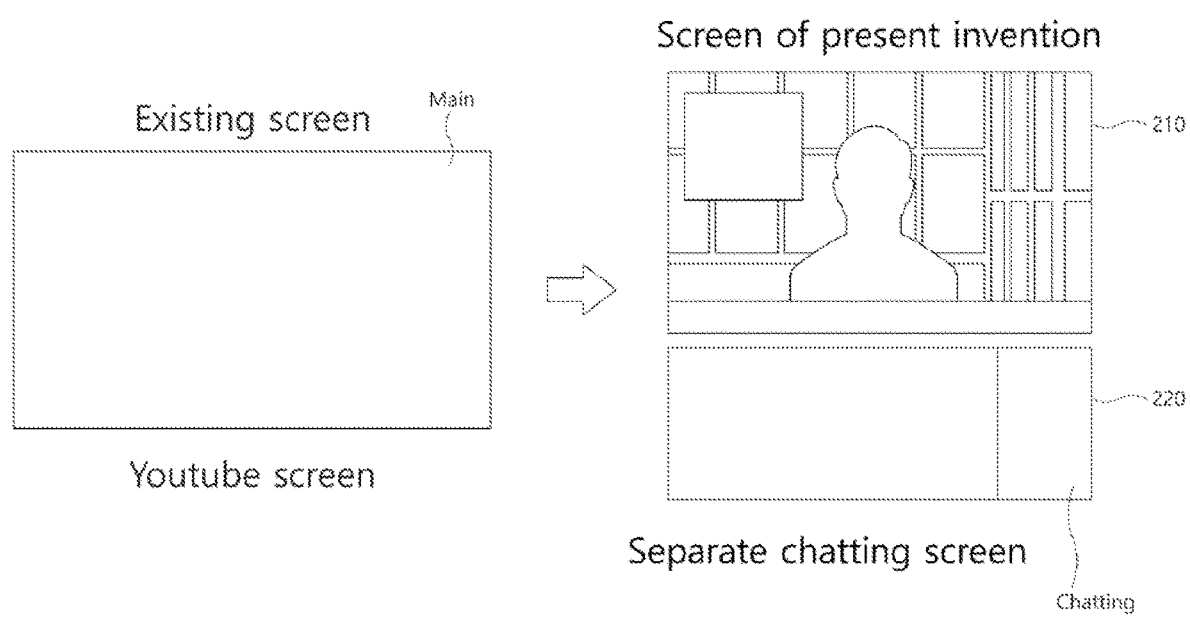

[Fig. 9]
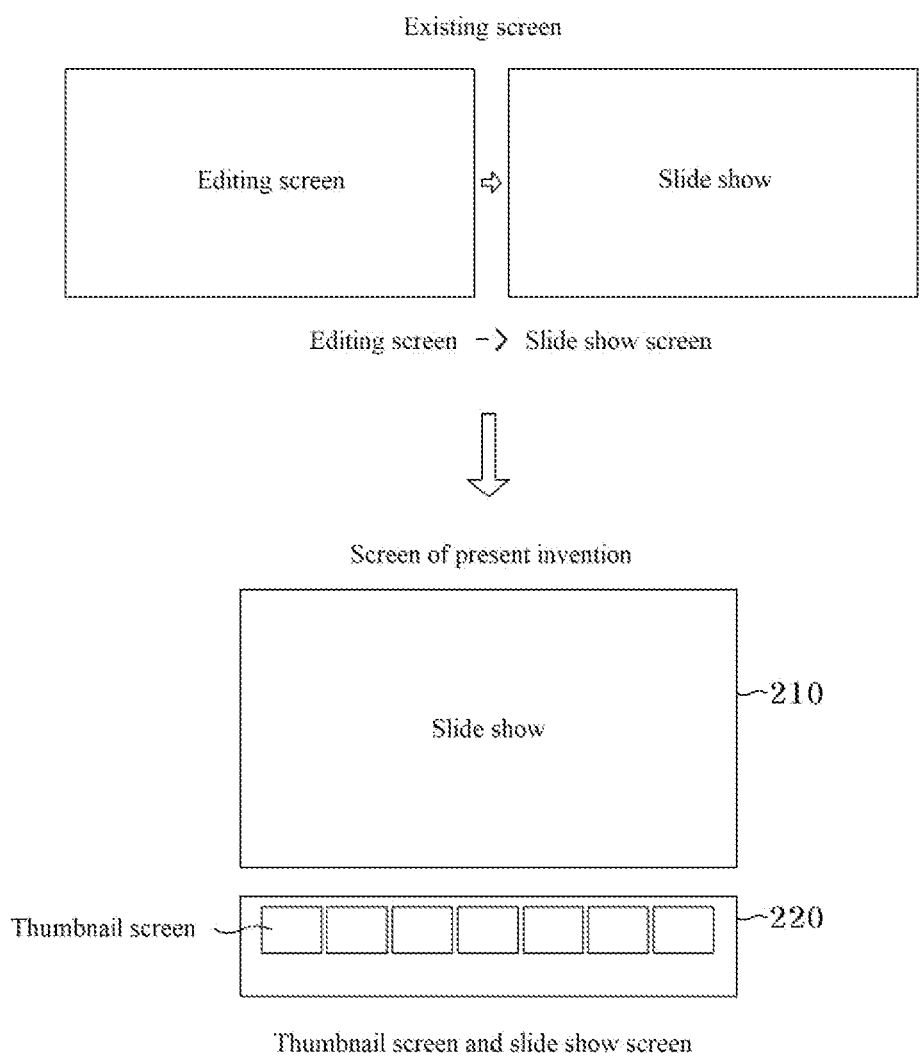

[Fig. 10]
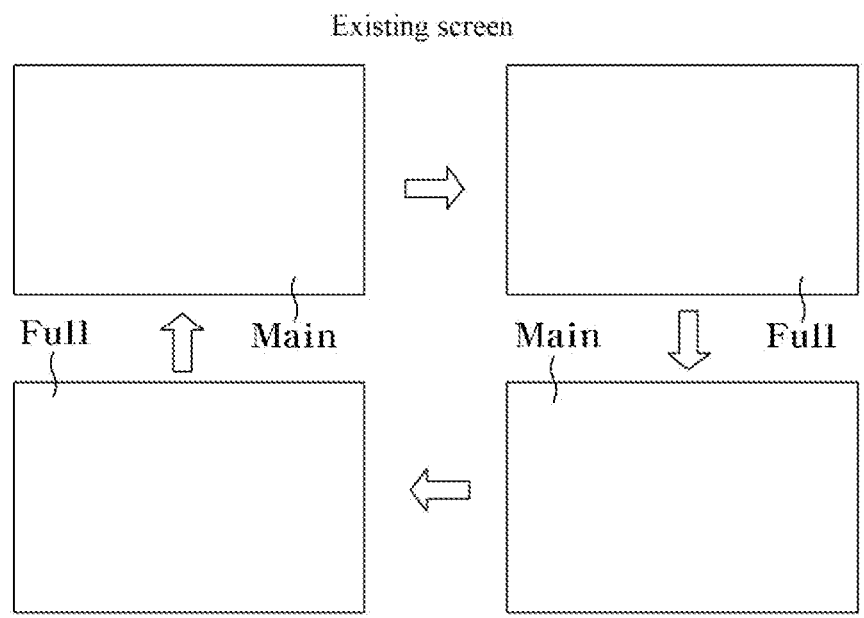
Product search result screen and product detail search
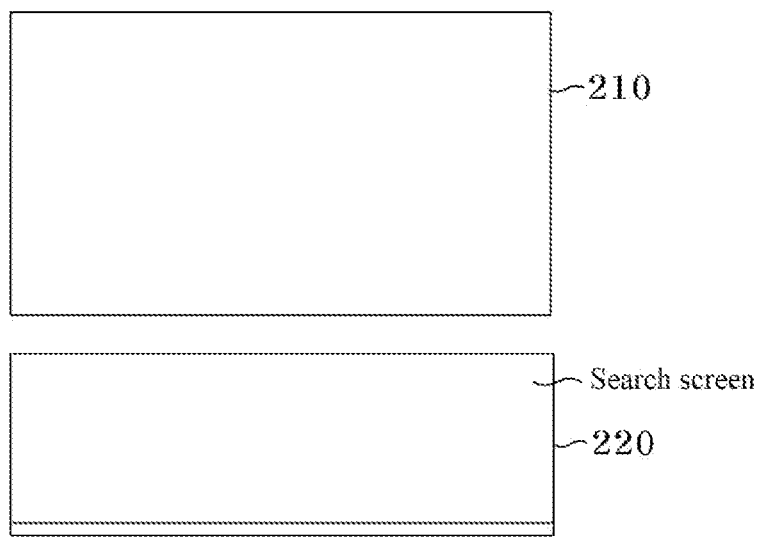
Separate product search result screen and product detail search screen

[Fig. 11]
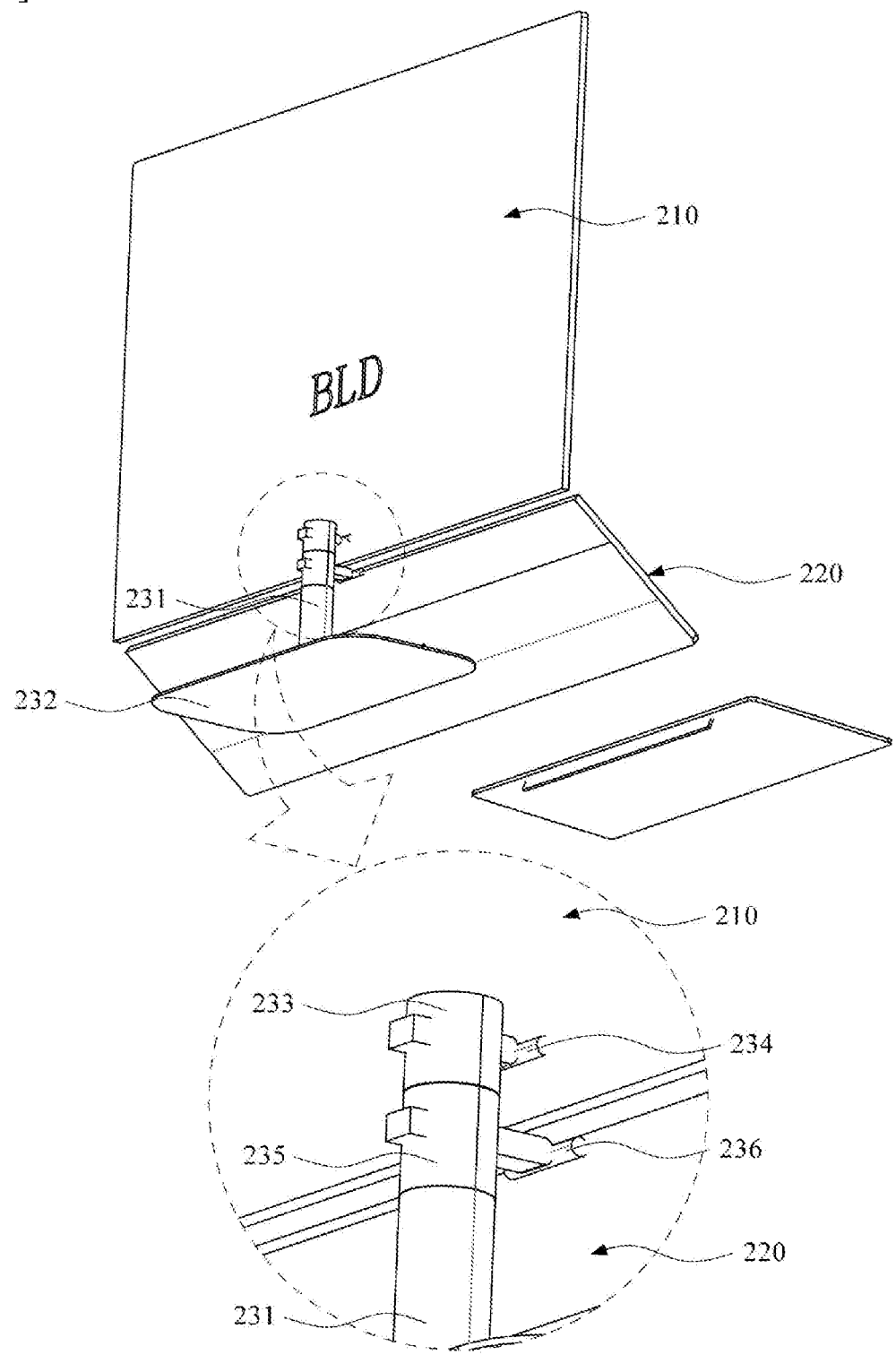

[Fig. 12]
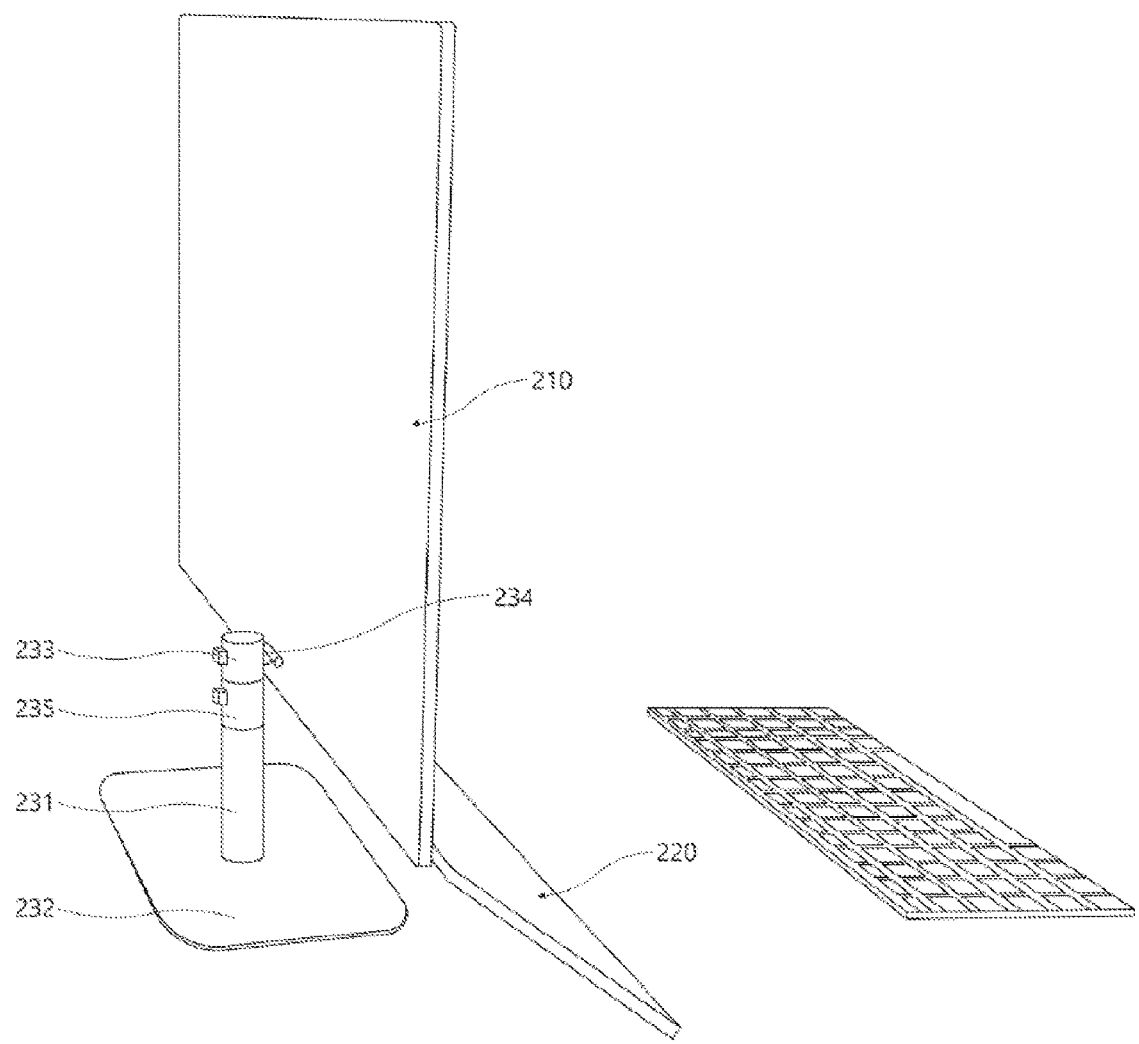

[Fig. 13]
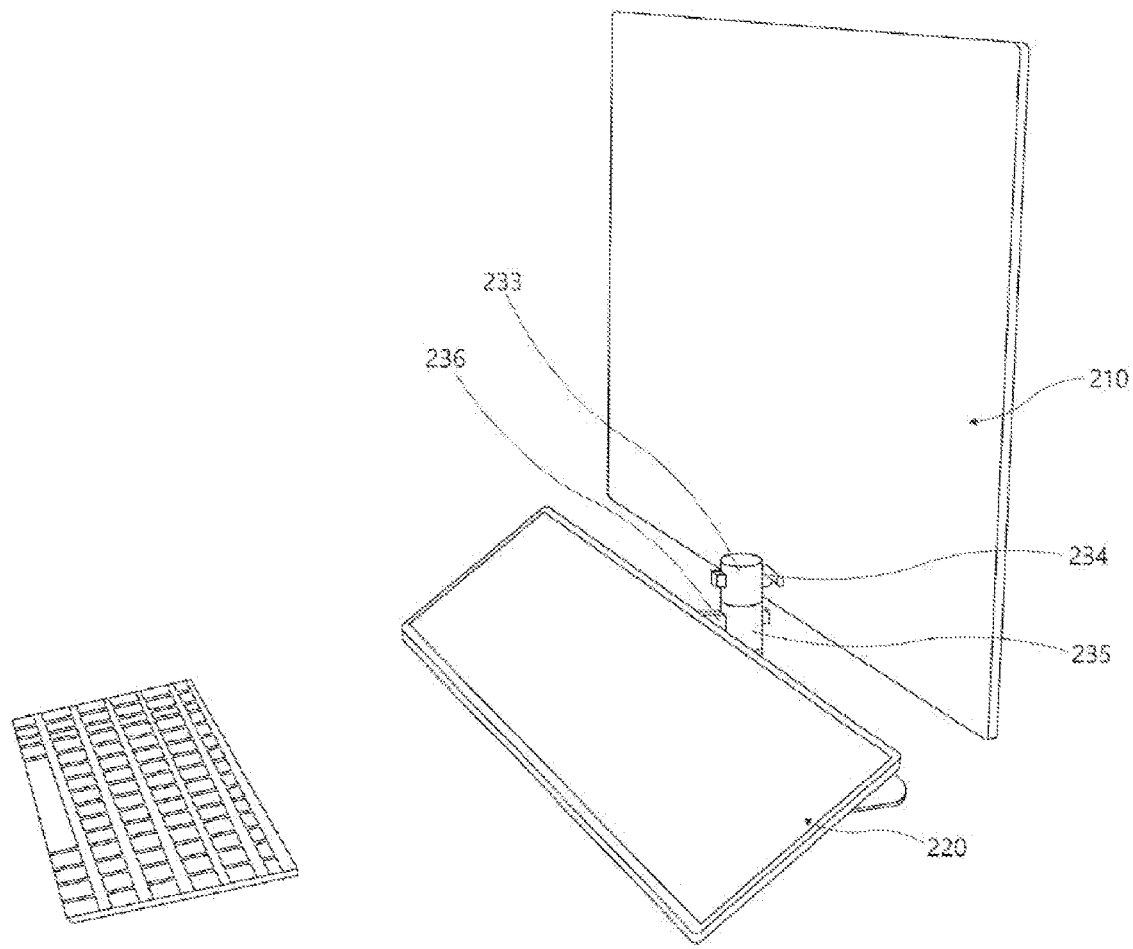

[Fig. 14]
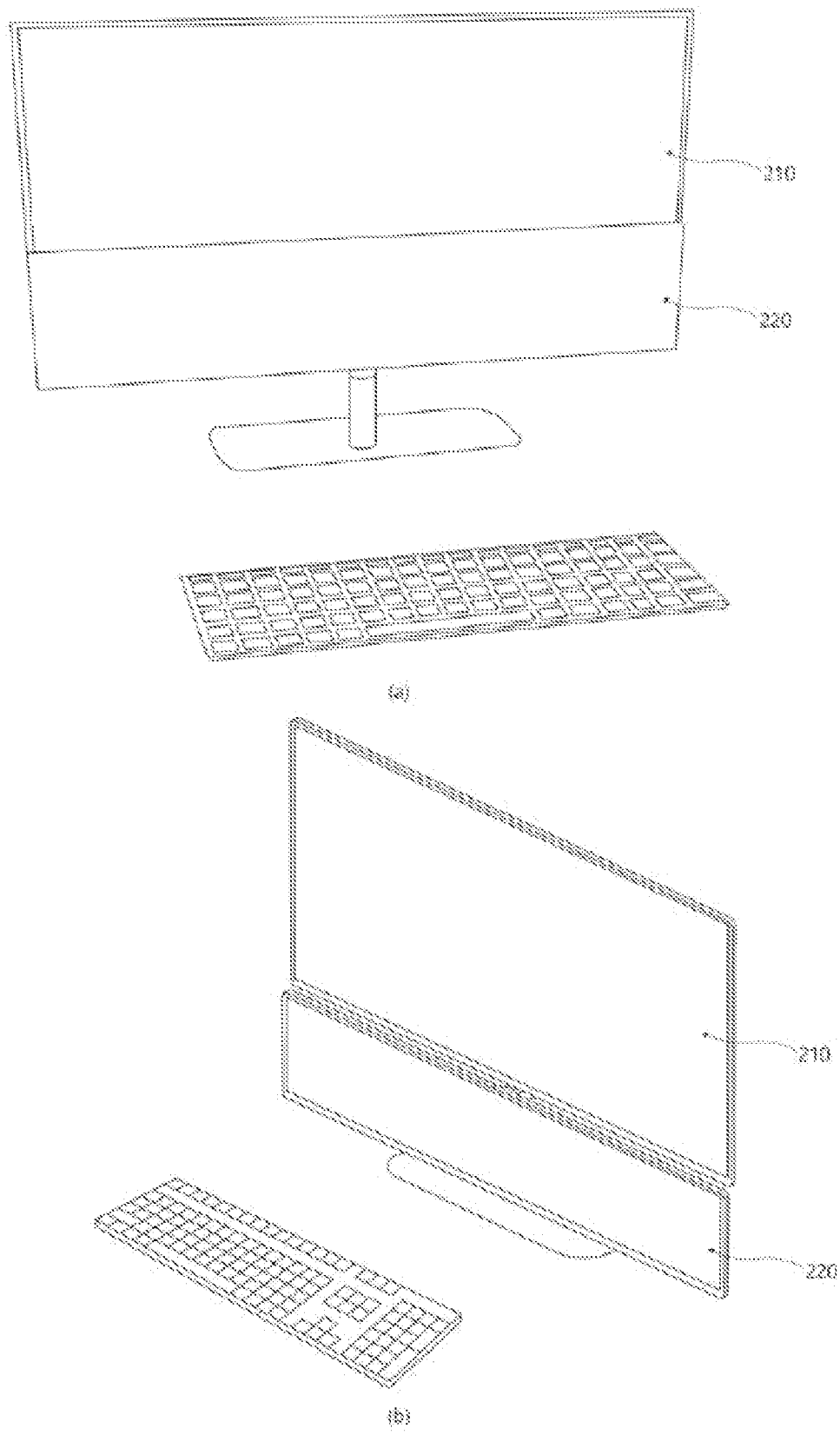

VERTICALLY ARRANGED FOLDER-TYPE DUAL MONITOR

CROSS-REFERENCE TO RELATED APPLICATIONS

This application is a National Stage of International Application No. PCT/KR2020/007951 filed Jun. 19, 2020, which claims priority to Korean Patent Application No. 10-2019-0072868 filed Jun. 19, 2019, the entire disclosures of which are incorporated herein by reference.

TECHNICAL FIELD

The present invention relates to a vertically arranged folder-type dual monitor, and more particularly, to a vertically arranged folder-type dual monitor to provide a separate sub monitor in the form of a folder to an existing monitor to efficiently divide a UI screen to efficiently operate screens displayed on the monitor.

BACKGROUND ART

As is well known, in the reality of being provided with convenience and relying on image operations of devices such as computers or TVs as the advantages of the development of the culture and civilization, when it is considered that the contents of the screen displayed on the monitor are increasingly being provided in various forms and in large quantities, with the limited area of the existing monitor, there is a limit to providing contents in a desired format and amount to achieve the purpose of providing the contents in terms of screen content providers. Further, from the user's point of view, the user needs to bear the inconvenience and inefficiency of the screen operation due to the overlapped, divided, and reduced multiple screens provided through the limited area.

Therefore, a technique that contributes to efficient screen operation on the monitor by providing sub monitors is demanded to overcome the limitations of the limited amount and format to display the screen contents on the existing monitor.

CITATION LIST

[Patent Document 1] Korean Registered Patent Publication No. 1796683 (entitled Notebook including rotary hinge to implement bidirectional dual monitor, published on Nov. 10, 2017)
[Patent Document 2] Korean Registered Patent Publication No. 1440315 (entitled Notebook having sub monitor and display control method of the same, published on Oct. 2, 2014)

DISCLOSURE

Technical Problem

A technical object to be achieved by the spirit of the present invention is to provide a vertically arranged folder-type dual monitor which provides a separate folder-type sub monitor to an existing monitor to efficiently divide the UI screen to be used, for efficient operation of a screen displayed on the monitor.

Technical Solution

In order to achieve the above-described object, an exemplary embodiment of the present invention provides a vertically arranged folder-type dual monitor, including: a main monitor having a vertical width of a first size; and a sub monitor which has a vertical width of a second size smaller than the vertical size of the first size and ascends and descends at a certain inclination angle relative to a hinge part formed on the lower end of the main monitor, in which the screen is divided by the main monitor and the sub monitor to provide different UIs.

Here, a mouse type 4D touch pad module which is embedded on one side surface of the sub monitor to be stored is formed, and the 4D touch pad module includes: a disk-shaped touch pad which recognizes a coordinate to perform pointing; a division boundary layer which is formed above the touch pad and is configured by a ring-shaped first division boundary layer which divides an upper portion of the touch pad into a circular center touch pad and a side touch pad and a linear second division boundary layer which individually divides the side touch pad in an arc shape; a side button which has a through hole formed on a center area through which a wiring line passes and divides an outside area while accommodating the touch pad so as to expose an upper portion of the touch pad to perform a side button function by pushing the side touch pad; an FPCB which has a touch pad FPCB connection part formed in a center area to which the touch pad wiring line is connected and two or more side button contacts respectively formed which are radially disposed at an outside area corresponding to the side button to be electrically connected by pushing the side button; and upper/lower housings in which the division boundary layer, the touch pad, the side button, and the FPCB are sequentially laminated to be accommodated therein, short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch by the center touch pad and the movement continues according to the stored touch response sensitivity without repeatedly touching while the touch is maintained after reaching the side touch pad so that the long-distance pointing of a desired pointing coordinate when the touch is released after reaching a desired pointing coordinate is performed to perform the unlimited long-distance pointing as long as desired even with a very small area of the touch pad.

Further, the mouse type 4D touch pad module is configured as an integrated module which is physically coupled to one side surface of the sub monitor to interwork with a keyboard or a separable module which is withdrawn from the sub monitor to be wirelessly connected to the keyboard to be driven.

Further, the side touch pad and the side button are divided by the second division boundary layer into four side touch pads of STU, STD, STL, and STR and four side buttons of SBU, SBD, SBL, and SBR with the same interval, respectively, various functions of a graphic controller are performed by one or a specific combination of the center touch pad, the side touch pad, and the side button, and further, the division boundary layer is set to have a height of 0.5 mm to 1.0 mm enough to recognize a boundary and easily cross the boundary while touching during the interworking by a specific combination.

Further, the second size may be formed to be 35% to 45% of the first size.

Further, a main screen and an auxiliary screen are divided by UI manipulation of a user to be displayed on the main monitor and the sub monitor, respectively, the main monitor displays a main screen which is working and the sub monitor displays pop-up ads or a program update notification or plays and displays Youtube or displays messengers or SNS, the main monitor displays a documentation tool, a development tool, or an image editing tool and the sub monitor disposes a ribbon menu of the corresponding tool to be displayed, or the main monitor displays multiple video conference images and the sub monitor displays an auxiliary screen for sub tasks.

Further, UIs which are modified and changed to be provided by the program providers are separated for a main screen and an auxiliary screen to be displayed on the main monitor and the sub monitor, respectively, and the main monitor displays a main screen which is working and the sub monitor displays a list of programs which are being activated or recently used files or recently used programs.

Further, the main monitor displays a Youtube video in a Youtube full screen mode and the sub monitor displays a list of Youtube videos to be played, the main monitor displays a streamer image and the sub monitor displays a chatting screen, the main monitor displays a slideshow screen of a presentation program and the sub monitor displays a slide thumbnail screen or an editing screen of the presentation program or the main monitor displays a search result list page of web shopping homepages and the sub monitor displays product detail information pages for a product selected from the search result list.

Further, the vertically arranged folder-type dual monitor further includes a support which vertically supports a rear end surface of the main monitor; a holder which fixes the support to the floor; a first pivot unit which is coupled to an upper end of the support to vertically move the main monitor in a vertical direction and pivot in a horizontal direction, and a second pivot unit which is coupled to a rear end surface of the main monitor from the first pivot unit in a horizontal direction to vertically pivot the main monitor at a longitudinal part.

Further, the vertically arranged folder-type dual monitor further includes a third pivot unit which is coupled to a lower end of the first pivot unit of the support to vertically move the sub monitor in the vertical direction and pivot in the horizontal direction; and a fourth pivot unit which is coupled to one upper end of the sub monitor from the third pivot unit to vertically pivot the main monitor at a longitudinal part.

Further, a vertical height of the first pivot unit and the third pivot unit with respect to the support and a vertical rotation angle of the second pivot unit and the fourth pivot unit are controlled to locate the display screens of the main monitor and the sub monitor on the same flat plane.

Advantageous Effects

According to the present invention, a folder-type sub monitor is attached at a lower end of the normal monitor of the related art to be folded not in use and unfolded at a desired angle during the usage. Further, the screen is divided to provide different UIs to make it possible to efficiently perform tasks when running a single program or multiple programs. Further, a T-mouse with an ultra-small and ultra-thin 4D touch pad module mounted therein is provided to be stored in the accommodating space of the sub monitor while minimizing the loss probability.

Further, when an additional sub monitor to display a screen is provided, it is a welcome change for program providers as it overcomes a spatial limitation for providing various types of screens and additional functions of screen operation. Further, when such a sub monitor is provided, the program providers may seek a way to efficiently divide the screen to have the same effect as using a larger monitor than the actual monitor so that the benefit of efficient screen operation may be provided to the users.

Further, when the sub monitor is provided, the user may not only enjoy the benefit of the efficient screen division provided by the program providers, but also operate the screen according to the user's preference and efficiency using a screen which is provided to arbitrarily change the shape and be rearranged as desired by the user.

Further, the 4D touch pad module which perfectly serves as a graphic controller with an ultra-small size and an ultra-thin thickness may be stored in an accommodating space of the sub monitor for a long time, without a losing possibility.

Further, there is no objection that both the program providers and the users enjoy the benefits of the sub monitors. Therefore, the provision of the dual monitors for screen operation will naturally become standardized as a trend and in the end, the program providers may provide various shapes of screens and functions suitable for the dual monitors having a standardized ratio as a trend, which may become a trigger to reorganize the market by preparing the turning point of the change in the monitor providing mode.

DESCRIPTION OF DRAWINGS

FIG. 1 illustrates a vertically arranged folder-type dual monitor according to an exemplary embodiment of the present invention.

FIG. 2 illustrates a folding operation of a sub monitor of a vertically arranged folder-type dual monitor of FIG. 1 and an example of using a 4D touch pad module.

FIGS. 3A and 3B illustrate exploded views of main configurations of a 4D touch pad module of FIG. 2.

FIGS. 4A and 4B illustrate a wiring diagram of an FPCB of a 4D touch pad module of FIGS. 3A and 3B and a pushing operation of a side button.

FIGS. 5A, 5B, 5C, 6A, and 6B illustrate examples of using divided monitors of the vertically arranged folder-type dual monitor of FIG. 1 by UI manipulation of a user.

FIGS. 7A, 7B, 8A, 8B, 9 and 10 illustrate an example of using divided monitors by a UI provided by a program provider of the vertically arranged folder-type dual monitor of FIG. 1, respectively.

FIG. 11 illustrates a pivot structure of a vertically arranged folder-type dual monitor of FIG. 1.

FIGS. 12 and 13 illustrate a rotation configuration of a monitor by a pivot structure of a vertically arranged folder-type dual monitor of FIG. 11.

FIG. 14 illustrates an example of using a vertically arranged folder-type dual monitor of FIG. 11 on the same flat plane.

MODES OF THE INVENTION

Hereinafter, embodiments of the present invention having the above-described features will be described in more detail with reference to the accompanying drawings.

Referring to FIGS. 1 to 10, a vertically arranged folder-type dual monitor according to the exemplary embodiment of the present disclosure includes a main monitor 210 having a vertical width of a first size and a folder-type sub monitor 220 which has a vertical width of a second size smaller than the vertical width of the first size and ascends and descends at a certain inclination angle relative to a hinge part 221 formed on the lower end of the main monitor 210 so that a screen is divided by the main monitor 210 and the sub monitor 220 to provide different UIs.

Here, the second size of the sub monitor 220 is formed to be 35% to 45%, desirably, 40% of the first size of the main monitor 210 while maintaining a horizontal width to be the same, so that the light weight may be implemented by minimizing a weight due to the sub monitor 220 while ensuring a readability and an availability of the sub monitor 220.

Therefore, as illustrated in FIG. 2, according to the efficiency and the convenience of the user, during the usage, the upper end of the sub monitor 220 ascends with the hinge part 221 as a rotation axis to be inclined at a predetermined angle to be operated as an auxiliary monitor for an additional task or an auxiliary task.

In the meantime, a main screen and an auxiliary screen are divided by the UI manipulation according to the user's preference and efficiency to be displayed on the main monitor 210 and the sub monitor 220, respectively.

That is, in the case of the screen provided to arbitrarily change and rearrange a shape as desired by the user, the screen may be divided to be operated in accordance with the user's preference and efficiency.

As illustrated in FIGS. 5A, 5B, 5C, and 6A and 6B, a screen operation example which efficiently operates the screen by separately and appropriately disposing the main screen on the main monitor 210 and disposing the auxiliary screen on the sub monitor 220 according to the convenience of the user will be described in detail as follows.

Referring to FIGS. 5A, 5B, and 5C, the main monitor 210 displays a main screen for document editing which is working or web surfing and the sub monitor 220 displays pop-up ads (see FIG. 5A) or a program update notification or plays and displays Youtube (FIG. 5B) or displays a messenger or SNS (FIG. 5C).

Therefore, a pup-up screen P such as pop-up ads and a program update notification which suddenly appears without any notice during the working is displayed as the top screen by covering the main screen which is working, which may always cause the inconvenience and dissatisfaction to users who want to focus on their tasks. Therefore, the window taskbar is moved to be displayed on the auxiliary screen to display all the ads and pop-up screens on the sub monitor 220 so that the inconvenience and the dissatisfaction may be solved.

Further, when the user wants to perform document editing or web surfing while watching Youtube, it is inconvenient to divide the screen to adjust the windows to have smaller sizes to see both the windows to perform multi-tasking. In order to overcome the inefficiency and the inconvenience, the document editing or web surfing screen is disposed on the main screen and Youtube is played on the auxiliary screen to simply enable the multi-tasking.

Further, when a program which interworks with smartphone, such as messengers (Kakao Talk, Line, Facebook messenger) or SNS (Twitter, Facebook, Instagram) is used while performing a main task such as document editing or web surfing, the screens are displayed to be overlaid so that it is inconvenient to check or transmit messages. Therefore, when the document editing or web surfing screen is disposed on the main screen and the messenger or SNS screen is disposed on the auxiliary screen, the message can be checked without switching screens to conveniently perform the multi-tasking.

Further, referring to FIGS. 6A and 6B, a documentation tool, a development tool, or an image editing tool is displayed on the main monitor 210 and a ribbon menu of the corresponding tool is disposed on the sub monitor 220 (see FIG. 6A) or multiple video conference images are displayed on the main monitor 210 and an auxiliary screen for a sub task is displayed on the sub monitor 220 (see FIG. 6B).

Therefore, in order to embrace the demands of the users which become more complex, the functions of documentation tools, development tools, and image editing tools have been diversified. Therefore, the number of icons to be displayed in the ribbon menu is increasing so that an area for displaying the menu is getting larger and an available main screen of the main monitor 210 for a task is getting smaller. In order to improve this, when the ribbon menu for each tool and a main task window are separated to dispose only the main task window on the main screen and dispose the ribbon menu on the auxiliary screen, the space utilization is maximized to provide the main task window in the maximum size.

When auxiliary materials required for the meeting is searched during the video conference in a full screen mode with multiple participants or the meeting is conducted while viewing materials to be referenced in the meeting, the efficient video conference may be made possible by searching for the materials or executing the reference materials on the auxiliary screen.

Alternatively, as illustrated in FIGS. 7 to 10, UIs which are modified and changed to be provided by the program providers are divided into a main screen and an auxiliary screen to be displayed on the main monitor 210 and the sub monitor 220.

That is, when the user cannot arbitrarily modify, change, and dispose the UIs, in order to efficiently use a screen space of the dual monitors, as illustrated in FIGS. 6A and 6B, a company which provides the program originally modifies and changes the UI of the screen to be appropriate for the dual monitors to allow the space to be efficiently used. Such a screen operation example will be described in detail as follows.

Referring to FIGS. 7A and 7B, the main monitor 210 may display the main screen which is working and a sub monitor may display a list of programs which are being activated (see FIG. 7A) or display recently used files or recently used programs (see FIG. 7B).

Therefore, as illustrated in FIG. 7A, the sub monitor 220 is used as a display area of a taskbar/[a list of programs which are currently being activated]. When alt-tab or win-tab keys are input, the [list of programs which are being currently activated] is displayed and a program is selected from the list to switch the window to the main window to be displayed. Even though there is a disadvantage in that the [list of programs which are being currently activated] is displayed on the main window which is working, if the auxiliary screen is utilized to always display the [list of programs which are being currently activated], the switching to a necessary program may be possible only by one operation.

Further, as illustrated in FIG. 7B, when win-tab keys are input, a [list of programs which have been activated so far] is displayed at the bottom of the [list of programs which are currently being activated]. When a program is selected from the list, the program is executed to be displayed as the main window. However, in this case, there are disadvantages in that the [list of programs which have been activated so far] is displayed on the main window which is working and the list can be seen after two operations of pushing win-tab keys and moving to the down, so that if the auxiliary screen is utilized to always display the [list of programs which have been activated so far], the switching to a necessary program may be easily performed.

Further, referring to FIGS. 8 to 10, the main monitor 210 displays a Youtube video in a Youtube full screen mode and the sub monitor 220 displays a list of Youtube videos to be played (see FIG. 8A). Alternatively, the main monitor 210 displays a streamer image and the sub monitor 220 displays a chatting screen (see FIG. 8B). Further, the main monitor 210 displays a slideshow screen of a presentation program and the sub monitor 220 displays a slide thumbnail screen or an editing screen of the presentation program (see FIG. 9) or the main monitor 210 displays a search result list page of web shopping homepages and the sub monitor 220 displays product detail information pages for a product selected from the search result list (see FIG. 10).

Therefore, in order to watch another video while watching the Youtube in a full screen mode, the full screen mode needs to be finished to select another video. However, if the Youtube is played on the main screen in the full screen mode and a video to be played next is selected while watching a list to be played on the auxiliary screen, it is convenient to watch the next video by one operation.

Further, during a network game and Youtube broadcast, users with a common purpose are gathered to chat to communicate with each other while playing games or watching the broadcast. At this time, chats are mainly displayed on one side of the screen to be displayed in a part of a game screen or a broadcasting screen. However, in the Youtube, when the broadcasting screen is displayed in the full screen mode, the chats cannot be watched. Therefore, even though the chatting screen is separated from the network game screen or the Youtube broadcasting screen to display the game screen or the broadcasting screen on the main screen in the full screen mode, the chats are displayed on the auxiliary screen so that the game playing or Youtube broadcast watching may be smoothly performed.

Further, when the screen is switched to a slide show screen while editing the slide in the PowerPoint, the slide is displayed in the full screen mode so that in order to edit the slide or select another slide, it is inconvenient to end the slide screen displayed in the full screen mode. Therefore, if the slide thumbnail screen or an editing screen is disposed on the auxiliary screen to be displayed while always displaying the slide show screen on the main screen, the edition and the selection of the other screen may be conveniently performed while checking the slide show screen.

Further, in a general web shopping homepage, when a product is selected from a search result list after searching a product, the screen moves to a detailed information page screen so that it is inconvenient to shop by moving forward and backward between the search result list page and the product detail information page. Therefore, when the product detail information page selected from the product search result list is displayed on the main screen by displaying the product detail information page on the main screen and the search result list page on the auxiliary screen, the product detail information page can be seen by one selection, which may double the convenience of the shopping.

In the meantime, as illustrated in FIG. 2, the 4D touch pad module 100 is configured in the form of a mouse to be stored by being embedded on one lower end of the sub monitor 220 so that a mouse with a 4D touch pad module 100 mounted therein to perform a function of a graphic controller with an ultra-thin thickness and an ultra-small size is provided to replace a normal touch pad.

For example, a mouse which is a separate ultra-thin and small graphic controller with the 4D touch pad module 100 mounted therein is manufactured to be embedded in a side accommodating space of the sub monitor 220 to perform not only a function of a graphic controller, but also a function of a direction key.

Here, the mouse type 4D touch pad module 100 may be configured as an integrated module which is physically coupled to one side surface of the sub monitor 220 to interwork with a keyboard or a separate module which is withdrawn from the sub monitor 220 to be wirelessly connected to the keyboard to be driven.

Specifically, as illustrated in FIGS. 3A, 3B, 4A and 4B, a 4D touch pad module specifically, includes a touch pad 110, a division boundary layer 120 divided into a center touch pad area and respective side touch pad areas, a side button 130 which performs a side button function by pushing side touch pads 112a, 112b, 112c, and 112d, an FPCB 140 having a touch pad FPCB connection part 141 and a side button contact 142 formed thereon, and upper/lower housings 150 and 160. The short-distance pointing is performed only by a center touch pad 111 and the long-distance pointing is performed in parallel by a combination of the center touch pad 111 and the side touch pads 112a, 112b, 112c, and 122d. In the case of the long-distance pointing, a touch response sensitivity when the touch starts from the center touch pad and then reaches the corresponding side touch pad 112a, 112b, 112c, or 112d is stored. Therefore, the movement continues according to the stored touch response sensitivity even without repeated touches while the touch is maintained after reaching the side touch pads 112a, 112b, 112c, and 112d so that when the touch reaches a desired pointing coordinate, and then is released, the long-distance pointing of a desired pointing coordinate is performed, thereby performing unlimited long-distance pointing as long as desired even with the very small area of the touch pad 110.

First, the touch pad 110 is formed to have a disk shape and recognizes a pointing coordinate by the touch of the touch sensor (not illustrated) to perform the pointing.

For example, the touch pad 110 may be configured to be divided into a center touch pad 111 which performs the short-distant pointing alone and side touch pads 112a, 112b, 112c, and 112d which perform long-distance pointing and various basic functions of the touch pad and additional functions which are not provided by the touch pad of the related art in parallel.

Here, the side touch pads 112a, 112b, 112c, and 112d are configured to be divided by a second division boundary layer 122 to be described below into four side touch pads corresponding to side touch up (STU) 112a, side touch down (STD) 112b, side touch left (STL) 112c, and side touch right (STR) 112d, with the same interval.

In the meantime, to be more specific, the long-distance pointing is designed such that a touch response sensitivity is stored when the touch reaches the side touch pads 112a, 112b, 112c, and 112d after starting the touch by the center touch pad 111 and the movement continues according to the stored touch response sensitivity even without repeated touches while the touch is maintained after reaching the side touch pads 112a, 112b, 112c, and 112d. Therefore, when the touch is released after reaching a desired pointing coordinate, the long-distance pointing of the desired pointing coordinate is performed.

As described above, a touch response sensitivity is stored when the touch reaches the side touch pads 112a, 112b, 112c, and 112d after starting the touch by the center touch pad 111 and unlimited movement is allowed according to the stored touch response sensitivity even without repeated touches while the touch is maintained after reaching the side touch pads 112a, 112b, 112c, and 112d so that the long-distance pointing for as long as desired may be efficiently and conveniently performed even with the very small area which is not comparable with the touch pad of the related art.

Next, the division boundary layer 120 is formed above the touch pad 110 and is configured by a ring-shaped first division boundary layer 121 which divides an upper area of the touch pad 110 into a circular center touch pad 111 and side touch pads 112a, 112b, 112c, and 112d at the outside and a linear second division boundary layer 122 which uniformly and individually divides the side touch pads 112a, 112b, 112c, and 112d in an arc shape.

Here, the division boundary layer 120 is set to have a height of 0.5 mm to 1.0 mm enough to recognize a boundary between the center touch pad 111 and the side touch pads 112a, 112b, 112c, and 112d and easily cross the boundary while touching during the interworking by a specific combination of the center touch pad 111 and the side touch pads 112a, 112b, 112c, and 112d for the long-distance pointing.

That is, the division boundary layer 120 divides the touch pad 110 to perform various subdivided functions and allow a user to easily recognize a physical boundary by the first division boundary layer 121 and the second division boundary layer 122 with a sense of touch of a finger to prevent an erroneous operation over a boundary of a selective function set for the center touch pad 111 and each side touch pad 112a, 112b, 112c, 112d.

Next, the side button 130 has a through hole 131 through which a touch pad wiring line 113 passes in a center region and is configured to serve as a housing A which accommodates the touch pad 110 to expose an upper portion of the touch pad 110. Further, an outside area thereof is divided by the second division boundary layer 122 to serve as a side button function B by pushing the side touch pads 112a, 112b, 112c, and 112d.

Here, the side button 130 may be configured to be divided by the above-described second division boundary layer 122 into four side buttons corresponding to side button up (SBU) 131a, side button down (SBD) 131b, side button left (SBL) 131c, and side button right (SBR) 131d, with the same interval.

In the meantime, only one or a specific combination of the center touch pad 111, the side touch pads 112a, 112b, 112c, and 112d, and the side button 130 may faithfully perform various functions such as a basic function as a graphic controller and additional functions.

Next, in the FPCB 140, a touch pad FPCB connection part 141 to which the touch pad wiring line 113 is electrically connected is formed in a center region and two or more elastic side button contacts 142 which are radially disposed at an outside region corresponding to the side button 130 to be electrically connected by pushing the corresponding side button 130 are formed.

For example, first to fourth side button contacts 142a, 142b, 142c, and 142d corresponding to the side buttons 130 of SBU 131a, SBD 131b, SBL 131c, and SBR 131d are formed, respectively.

Further, one side button (SB; 132a, 132b, 132c, 132d) is pushed to electrically conduct one corresponding side button contact (SBCP; 142a, 142b, 142c, and 142d) to recognize click, double click, and long press of the side button SB.

Next, in the upper/lower housings 150 and 160, the division boundary layer 120, the touch pad 110, the side button 130, and the FPCB 140 are sequentially laminated to be accommodated therein.

Further, a circuit line C configured by the touch pad wiring line 113 and the side button wiring line 144 may be electrically connected to a connection terminal (not illustrated) of an external device by means of a connection groove (not illustrated) formed to be open at one side of the upper housing 150 or the lower housing 160.

Therefore, the 4D touch pad module fuses the advantages of the mouse and the touch pad of the related art and resets an operation principle simultaneously so that the 4D touch pad module is equipped with a touch pad having a small area which is incomparable to the area of the existing touch pad. Further, the 4D touch pad module sufficiently functions as the mouse, even with an ultra-thin thickness and small size, like the existing mouse or touch pad and additionally provides a new function which has not been provided by the existing mouse or touch pad to double the efficiency and the convenience.

Further, the 4D touch pad module which perfectly functions as a graphic controller, even with a very small area and an ultra-thin thickness may replace the existing touch pad.

FIG. 11 illustrates a pivot structure of a vertically arranged folder-type dual monitor of FIG. 1, FIGS. 12 and 13 illustrate a rotation configuration of a monitor by a pivot structure of a vertically arranged folder-type dual monitor of FIG. 11, and FIG. 14 illustrates an example of using a vertically arranged folder-type dual monitor of FIG. 11 on the same plane.

Referring to FIGS. 11 to 13, a support 231 which vertically supports a rear end surface of the main monitor 210, a holder 232 which fixes the support 231 on the floor, a first pivot unit 233 which is coupled to an upper end of the support 231 to vertically move the main monitor in a vertical direction and pivot the main monitor 210 in a horizontal direction, and a second pivot unit 234 which extends from the first pivot unit 233 in a horizontal direction to be coupled to the rear end surface of the main monitor 210 to vertically pivot the main monitor 210 at a longitudinal part are further provided so that a vertical height, a horizontal rotation angle, and a vertical rotation angle of the main monitor 210 may be freely controlled to be used.

Further, a third pivot unit 235 which is coupled to a lower end of the first pivot unit 233 of the support 231 to vertically move the sub monitor 220 in a vertical direction and pivot the sub monitor 220 in a horizontal direction and a fourth pivot unit 236 which is horizontally coupled to one upper end of the sub monitor 220 from the third pivot unit 235 to vertically pivot the sub monitor 220 at a longitudinal part are further provided to use the sub monitor 220 by freely controlling a vertical height, a horizontal rotation angle, and a vertical rotation angle of the sub monitor 220.

Therefore, as illustrated in FIG. 13, if necessary, the rotation angles of the main monitor 210 and the sub monitor 220 may be configured to be different.

In the meantime, referring to FIG. 14, when the sub monitor 220 is folded to block the lower end of the main monitor 210, the vertical heights of the first pivot unit 233 and the third pivot unit 235 with respect to the support 231 are controlled and the vertical rotation angles of the second pivot unit 234 and the fourth pivot unit 236 are controlled to locate the display screens of the main monitor 210 and the sub monitor 220 on the same flat plane to be used as one same screen.

Accordingly, with the configuration of the vertically arranged folder-type dual monitor, a folder-type sub monitor is attached at a lower end of the normal monitor of the related art to be folded not in use and unfolded at a desired angle during the usage. Further, the screen is divided to provide different UIs to make it possible to efficiently perform tasks when running a single program or multiple programs. Further, a T-mouse with an ultra-small and ultra-thin 4D touch pad module mounted therein is provided to be stored in the accommodating space of the sub monitor while minimizing the loss probability.

Therefore, configurations illustrated in the embodiments and the drawings described in the present specification are only the most preferred embodiment of the present invention and do not represent all of the technical spirits of the present invention, and thus it is to be understood that various equivalents and modified examples, which may replace the configurations, are possible when filing the present application.

[Explanation of Reference Numerals and Symbols]

| | |
|---|---|
| 210: Main monitor | 220: Sub monitor |
| 221: Hinge part | 100: Mouse type 4D touch pad module |
| 231: Support | 232: Holder |
| 233: First pivot unit | 234: Second pivot unit |
| 235: Third pivot unit | 236: Fourth pivot unit |
| 110: Touch pad | 111: Center touch pad |
| 112a,b,c,d: Side touch pad | 112a: STU |
| 112b: STD | 112c: STL |
| 112d: STR | 120: Division boundary layer |
| 121: First division boundary layer | 122: Second division boundary layer |
| 130: Side button | 131: Through hole |
| 132a: SBU | 132b: SBD |
| 132c: SBL | 132d: SBR |
| 140: FPCB | 141: Touch pad FPCB connection part |
| 142a,b,c,d: Side button contact | 150: Upper housing |
| 160: Lower housing | |

The invention claimed is:

1. A vertically arranged folder-type dual monitor, comprising:
   a main monitor having a vertical width of a first size; and
   a sub monitor which has a vertical width of a second size smaller than the vertical size of the first size and pivot at a certain inclination angle relative to a hinge part formed on a lower end of the main monitor,
   wherein a screen is divided by the main monitor and the sub monitor to provide different UIs,
   wherein a mouse type 4D touch pad module which is embedded on one side surface of the sub monitor to be stored is formed, and
   the 4D touch pad module includes:
   a disk-shaped touch pad which recognizes a coordinate to perform pointing;
   a division boundary layer which is formed above the touch pad and is configured by a ring-shaped first division boundary layer which divides an upper portion of the touch pad into a circular center touch pad and a side touch pad and a linear second division boundary layer which individually divides the side touch pad in an arc shape;
   a side button which has a through hole formed on a center area through which a wiring line passes and divides an outside area while accommodating the touch pad so as to expose the upper portion of the touch pad to perform a side button function by pushing the side touch pad;
   an FPCB which has a touch pad FPCB connection part formed in a center area to which the touch pad wiring line is connected and two or more side button contacts respectively formed which are radially disposed at an outside area corresponding to the side button to be electrically connected by pushing the side button; and
   upper/lower housings in which the division boundary layer, the touch pad, the side button, and the FPCB are sequentially laminated to be accommodated therein, and
   short-distance pointing is performed only by the center touch pad and long-distance pointing is performed in parallel by a combination of the center touch pad and the side touch pad, in the case of the long-distance pointing, a touch response sensitivity is stored when reaching the corresponding side touch pad after starting the touch by the center touch pad and a movement continues according to the stored touch response sensitivity without repeatedly touching while the touch is maintained after reaching the side touch pad so that the long-distance pointing of a desired pointing coordinate when the touch is released after reaching the desired pointing coordinate is performed to perform an unlimited long-distance pointing as long as desired even with a very small area of the touch pad.

2. The vertically arranged folder-type dual monitor according to claim 1, wherein the mouse type 4D touch pad module is configured as an integrated module which is physically coupled to one side surface of the sub monitor to interwork with a keyboard or a separable module which is withdrawn from the sub monitor to be wirelessly connected to the keyboard to be driven.

3. The vertically arranged folder-type dual monitor according to claim 2, wherein the side touch pad and the side button are divided by the second division boundary layer into four side touch pads of STU, STD, STL, and STR and four side buttons of SBU, SBD, SBL, and SBR with the same interval, respectively, various functions of a graphic controller are performed by one or a specific combination of the center touch pad, the side touch pad, and the side button, and the division boundary layer is set to have a height of 0.5 mm to 1.0 mm enough to recognize a boundary and easily cross the boundary while touching during the interworking by the specific combination.

4. The vertically arranged folder-type dual monitor according to claim 2, wherein the second size is formed to be 35% to 45% of the first size.

5. The vertically arranged folder-type dual monitor according to claim 2, wherein a main screen and an auxiliary screen are divided by UI manipulation of a user to be displayed on the main monitor and the sub monitor, respectively, the main monitor displays the main screen which is working and the sub monitor displays pop-up ads or a program update notification or plays and displays Youtube or displays messengers or SNS, the main monitor displays a documentation tool, a development tool, or an image editing tool and the sub monitor disposes a ribbon menu of the corresponding tool to be displayed, or the main monitor displays multiple video conference images and the sub monitor displays the auxiliary screen for sub tasks.

6. The vertically arranged folder-type dual monitor according to claim 2, wherein UIs which are modified and changed to be provided by program providers are divided into a main screen and an auxiliary screen to be displayed on the main monitor and the sub monitor, respectively and the main monitor displays the main screen which is working and the sub monitor displays a list of programs which are being activated or recently used files or recently used programs.

7. The vertically arranged folder-type dual monitor according to claim 6, wherein the main monitor displays a Youtube video in a Youtube full screen mode and the sub monitor displays a list of Youtube videos to be played, the main monitor displays a streamer image and the sub monitor displays a chatting screen, the main monitor displays a slideshow screen of a presentation program and the sub monitor displays a slide thumbnail screen or an editing screen of the presentation program or the main monitor displays a search result list page of web shopping homepages and the sub monitor displays product detail information pages for a product selected from the search result list.

8. The vertically arranged folder-type dual monitor according to claim 1, further comprising:
   a support which vertically supports a rear end surface of the main monitor;
   a holder which fixes the support to a floor;
   a first pivot unit which is coupled to an upper end of the support to vertically move the main monitor in a vertical direction and pivot in a horizontal direction; and
   a second pivot unit which is coupled to a rear end surface of the main monitor from the first pivot unit in a horizontal direction to vertically pivot the main monitor at a longitudinal part.

9. The vertically arranged folder-type dual monitor according to claim 8, further comprising:
   a third pivot unit which is coupled to a lower end of the first pivot unit of the support to vertically move the sub monitor in the vertical direction and pivot in the horizontal direction; and
   a fourth pivot unit which is coupled to one upper end of the sub monitor from the third pivot unit to vertically pivot the main monitor at a longitudinal part.

10. The vertically arranged folder-type dual monitor according to claim 9, wherein a vertical height of the first pivot unit and the third pivot unit with respect to the support and a vertical rotation angle of the second pivot unit and the fourth pivot unit are controlled to locate the display screens of the main monitor and the sub monitor on the same flat plane.

* * * * *